United States Patent
Ley et al.

(10) Patent No.: US 9,416,500 B2
(45) Date of Patent: Aug. 16, 2016

(54) SELF-PROPELLED COLD MILLING MACHINE, AS WELL AS METHOD FOR MILLING OFF AND TRANSPORTING AWAY A MILLED-OFF STREAM OF MATERIAL

(71) Applicant: Wirtgen GmbH, Windhagen (DE)

(72) Inventors: Herbert Ley, St. Katharinen (DE); Philip Verhaelen, Köln (DE); Cyrus Barimani, Königswinter (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 48 days.

(21) Appl. No.: 14/335,412

(22) Filed: Jul. 18, 2014

(65) Prior Publication Data
US 2015/0028653 A1    Jan. 29, 2015

(30) Foreign Application Priority Data

Jul. 26, 2013 (DE) .......................... 10 2013 214 675

(51) Int. Cl.
*E01C 23/088* (2006.01)
*E01C 23/12* (2006.01)
*B65G 21/08* (2006.01)

(52) U.S. Cl.
CPC ............. *E01C 23/088* (2013.01); *E01C 23/127* (2013.01); *B65G 21/08* (2013.01)

(58) Field of Classification Search
CPC ........ B65G 21/00; B65G 21/02; B65G 21/08; B65G 21/10
See application file for complete search history.

(56) References Cited

U.S. PATENT DOCUMENTS

| | | | |
|---|---|---|---|
| 4,037,391 A * | 7/1977 | Mitchell | A01D 45/16 198/494 |
| 5,722,789 A | 3/1998 | Murray et al. | |
| 7,175,364 B2 * | 2/2007 | Gaertner | E01C 23/088 299/39.2 |
| 7,422,390 B2 | 9/2008 | Gaertner et al. | |

FOREIGN PATENT DOCUMENTS

| | | |
|---|---|---|
| DE | 102012215013 A1 | 2/2014 |
| EP | 1507925 B1 | 2/2006 |
| JP | 2002-192008 A * | 7/2002 |
| WO | 03100172 A1 | 12/2003 |

OTHER PUBLICATIONS

European Search Report in corresponding European Application No. EP 14176858, dated May 15, 2015, 3 pp.

* cited by examiner

*Primary Examiner* — John Kreck
(74) *Attorney, Agent, or Firm* — Lucian Wayne Beavers; Patterson Intellectual Property Law PC

(57) ABSTRACT

In a self-propelled cold milling machine, in particular cold milling machine, for working ground surfaces, with a milling drum supported at a machine frame, no less than one conveying device arranged at the machine frame which accepts the milled-off material from the milling drum and discharges said milled-off material, in conveying direction, at a discharge end along a parabolic trajectory onto a point of discharge, it is provided for the following features to be achieved: that the conveying device comprises a shielding device at the discharge end, where said shielding device shields the material milled off and leaving the conveying device without influencing the parabolic trajectory on a part of the path to the point of discharge at least by means of lateral sections.

21 Claims, 6 Drawing Sheets

SELF-PROPELLED COLD MILLING MACHINE, AS WELL AS METHOD FOR MILLING OFF AND TRANSPORTING AWAY A MILLED-OFF STREAM OF MATERIAL

BACKGROUND OF THE INVENTION

1. Field of the Invention

The invention relates to a self-propelled cold milling machine for working ground surfaces, in particular roadways, as well as to a method for milling off and transporting away a milled-off stream of material of a cold milling machine.

2. Description of the Prior Art

A front-loading milling machine is known, for example, from EP 1 507 925, FIG. 1. The known cold milling machines feature a machine frame supported by crawler tracks or wheels. A milling drum is mounted in the machine frame transversely to the direction of travel. In order to achieve the completest possible removal of the milled-off material, the milling drum is generally enclosed by a housing, the wall of which pointing in the direction of travel is designed as a covering blade with an opening for the milled-off material. The material worked off by the milling drum is accepted by a first transport conveyor which transfers the worked-off material, at the forward end of the milling machine, onto a second transport conveyor which can be pivoted in incline and slewed laterally for transport onto a loading surface of a truck. Small milling machines feature a single transport conveyor only which is directed towards the rear as seen in the direction of travel and may also be designed to be pivoted in incline and slewed laterally. One embodiment of said cold milling machine, the so-called rear-loading milling machine, is illustrated, for example, in FIG. 5 of EP 1 507 925.

In operation, the milled-off stream of material exits from the conveying device at the upper discharge end of the conveying device comprising no less than one transport conveyor in the form of a parabolic trajectory and is discharged onto a point of discharge, for example, onto a loading surface of a truck. The parabolic trajectory is dependent on the variably adjustable conveying speed, on the composition of the milled-off material and on the angle of incline of the last transport conveyor.

Loading operations and positioning of the conveying device or the truck can be automated in accordance with said computable parabolic trajectory (DE 10 2012 215 013 A1).

The computability of the actual parabolic trajectory and the point of impingement may be impaired by outer environmental influences, such as strong wind or pressure waves created by traffic moving alongside the construction site. In addition, individual particles of the flow of material may be separated from the main stream of material, which essentially follows the parabolic trajectory, and may take a different path.

As a result, parts of the flow of material cannot be loaded onto the truck and transported away as intended, which requires additional sweeping operations to be performed;

the traffic moving alongside a construction site may be impaired by particles of the milled material leaving the main stream of material and, in extreme cases, damage may be caused to passing vehicles.

SUMMARY OF THE INVENTION

It is therefore the object of the invention to specify a cold milling machine as well as a method for milling off and transporting away a milled-off stream of material in which the discharge of the milled-off stream of material can be computed in an improved fashion and performed with improved reproducibility.

The above object is achieved according to the invention in that the conveying device comprises a shielding device at the discharge end, where said shielding device shields the milled-off material leaving the conveying device, without influencing the parabolic trajectory, at least in an initial section of the path to the point of discharge by means of, as a minimum, lateral sections.

The invention advantageously provides for a shielding device to be arranged at the discharge end of the conveying device, where said shielding device, on the one hand, shields towards the inside against outer influences, such as high wind speeds in transverse direction, and, on the other hand, shields towards the outside against individual particles of the milled material being separated from the main stream of material without influencing the parabolic trajectory resulting from the conveying speed, the angle of incline of the conveying device and the type of material being milled off. In this arrangement, the cover device is arranged so as to be unable to come into contact with the main stream of material.

During operation, the shielding device is preferably arranged in an operating position whereas it may be arranged in a transport position for transport of the cold milling machine. This offers the advantage of the overall length of the machine not being unnecessarily increased during transport or when moving the machine to a different operating site.

To this end, it may be intended for the shielding device to be transferable from an operating position into a transport position. The shielding device may be transferable from the operating position into a transport position and back by means of, for example, a pivoting operation, or via a mechanism, preferably a link mechanism, or a rail guide. Alternatively, the shielding device may be mountable/removable in the operating or transport position respectively.

In this arrangement, the shielding device may be pivotable laterally about an axis extending essentially orthogonally to the loading surface of the conveying device, or an essentially vertical axis, from an operating position into a transport position.

Alternatively, the shielding device may be pivotable or shiftable in longitudinal direction of the conveying device from a rear transport position into a forward operating position and back. This may, for example, be performed by means of a link mechanism or a rail guide.

According to a further alternative, the shielding device may be pivotable preferably downwards about an essentially horizontal axis from an operating position into a transport position.

It is preferably intended for the shielding device to have a U-shaped cross-section which shields the milled-off material to the sides by means of lateral sections and to the top by means of a cover. Such shielding device encloses the parabolic trajectory both laterally and towards the top.

In a further embodiment, it may be intended for the shielding device to be of multi-part design comprising laterally pivotable or shiftable or mountable panels with or without a cover.

The cover of the shielding device may comprise a cover plate or a screen plate or a flexible surface structure. With a flexible surface structure, such as a fabric or a tarpaulin, it is also possible to design the cover as a roller shutter or as a rollable surface structure, for example, from a rubber fabric.

The cover of the shielding device, at least, may exhibit a curvature radius in conveying direction that is larger than or the same as the farthest-reaching parabolic trajectory at maximum conveying speed of the milled-off material. It is thus ensured that the shielding device is unable to influence the parabolic trajectory and is in particular unable to create a diffusion effect.

The lateral sections of the shielding device may feature a height which increases downwards in conveying direction. This offers the advantage of ensuring lateral shielding also at the lowest possible conveying speed.

In the following, embodiments of the invention are explained in more detail with reference to the drawings.

BRIEF DESCRIPTION OF THE DRAWINGS

The following is shown.

DETAILED DESCRIPTION

Figure 1:
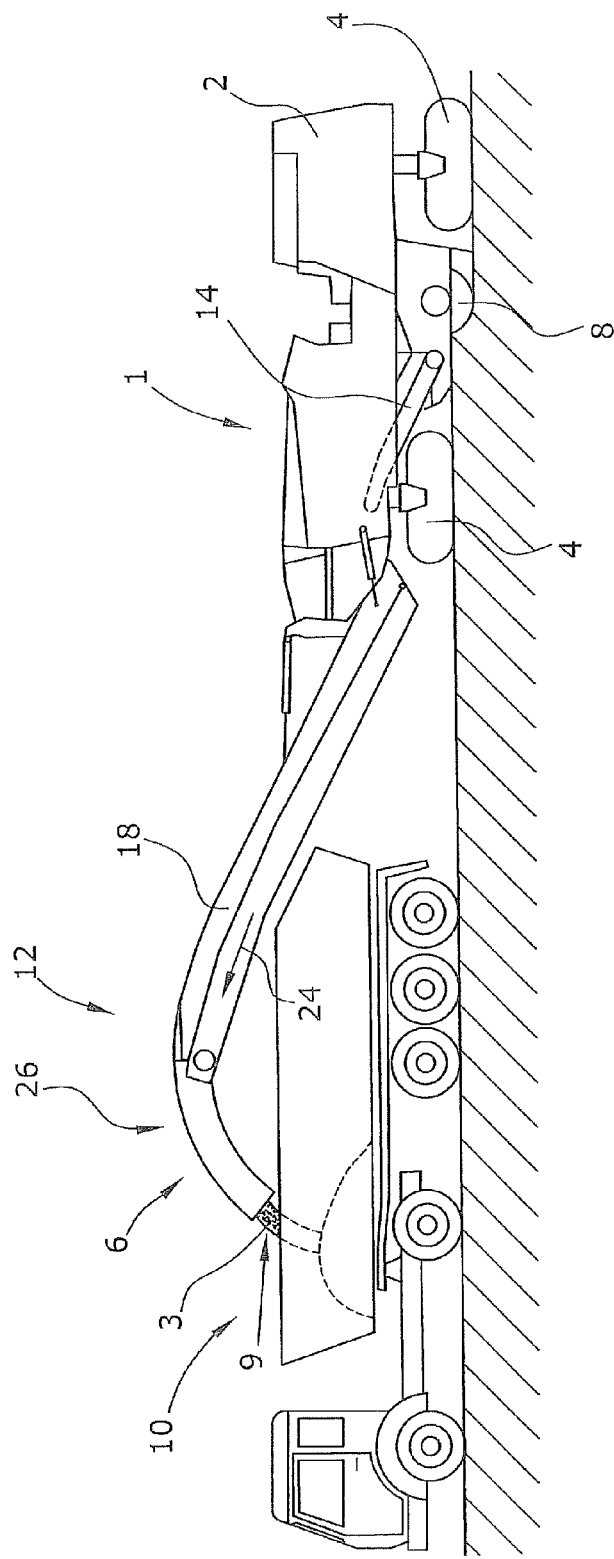
FIG. 1 shows the loading operation with a front-loading milling machine.

A milling machine 1 for working ground surfaces is shown in FIG. 1 in the embodiment of a front-loading milling machine. It is understood that the invention is also applicable to other types of milling machines provided with no less than one conveying device, in particular transport conveyor 18.

The milling machine 1 is used to mill off ground surfaces, in particular roadways made of asphalt, concrete or the like.

The milling machine 1 comprises a machine frame 2 which is supported by crawler tracks 4 or wheels. A milling drum 8, which extends transversely to the direction of travel, is mounted in the machine frame 2. It is understood that a corresponding transport conveyor 18 may also be mounted, for example, as the single conveying device on a rear-loading milling machine.

With a rear-loading milling machine, the milled-off material 3 is discharged against the direction of travel whereas with a front-loading milling machine in accordance with FIG. 1, the milled-off material 3 is conveyed to the front as seen in the direction of travel onto a transport vehicle 10. A first conveying device 14 comprising a transport conveyor is arranged in front of the milling drum 8 as seen in the direction of travel. The first transport conveyor 14 conveys the milled-off material 3 to a second conveying device comprising a transport conveyor 18. The second transport conveyor 18 is adjustable in height by means of an adjustable angle of inclination and can additionally be slewed laterally about, for example, ±30° so that transport vehicles 10 driving next to the track of the cold milling machine 1 can also be loaded.

Figure 2:
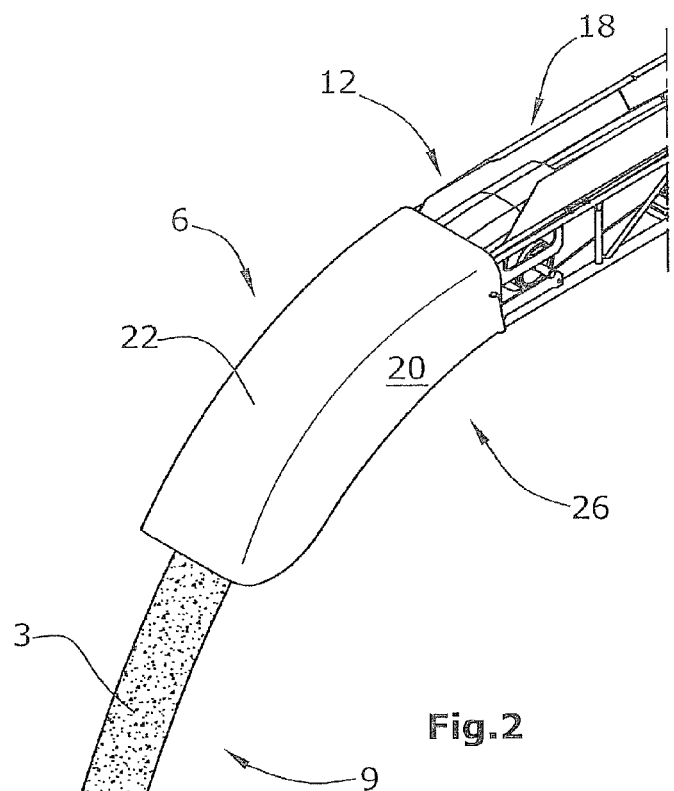
FIG. 2 shows a shielding device in operating position.

FIG. 2 shows a shielding device 6 arranged at a discharge end 12 of the conveying device 18, said shielding device 6 having an essentially U-shaped cross-section and comprising lateral sections 20 extending downwards essentially vertically on both sides from a cover 22 of the shielding device.

In FIG. 2, the shielding device 6 is depicted as a single-part element. It is understood, however, that the shielding device 6 may also be of multi-part design as will be illustrated in connection with FIGS. 4a and 4b.

In FIG. 2, the shielding device 6 is shown in its operating position 26 in which it encloses the material 3 being discharged along a parabolic trajectory 9 without influencing the parabolic trajectory 9 itself and without touching the main stream of the stream of material.

The curvature of the cover 22 is therefore curved, in conveying direction 24, by a curvature radius which is larger than or the same as the farthest-reaching parabolic trajectory 9 at the maximum conveying speed of the conveying device for the milled-off material 3.

Figure 6:
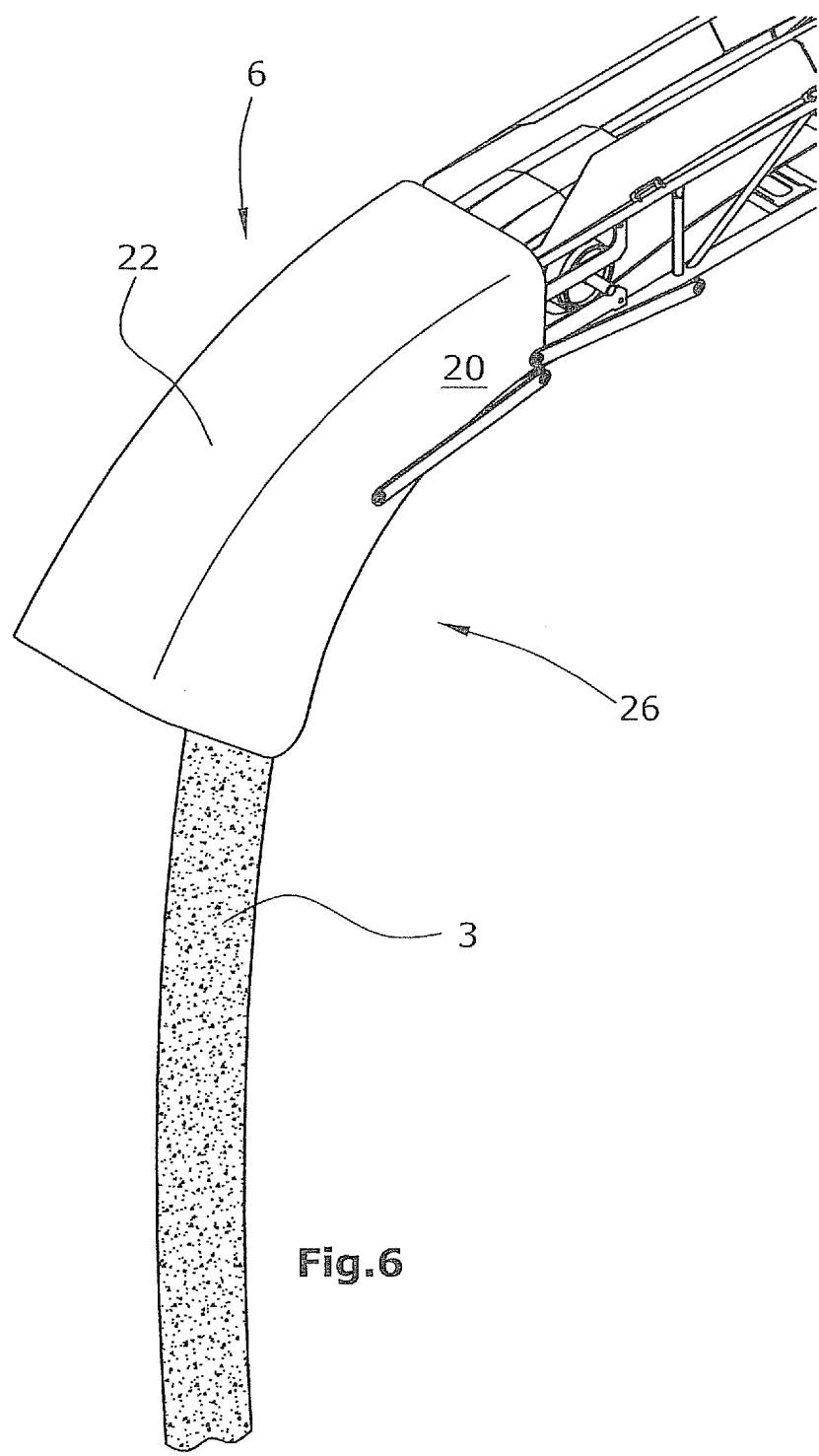
FIG. 6 shows a shielding device with elongated lateral sections.

For the shielding device 6 to be able to ensure shielding also at low conveying speeds, it may be intended for the lateral sections 20 to feature a height which increases downwards as seen in the conveying direction as depicted in the embodiment shown in FIG. 6.

Figure 3A:
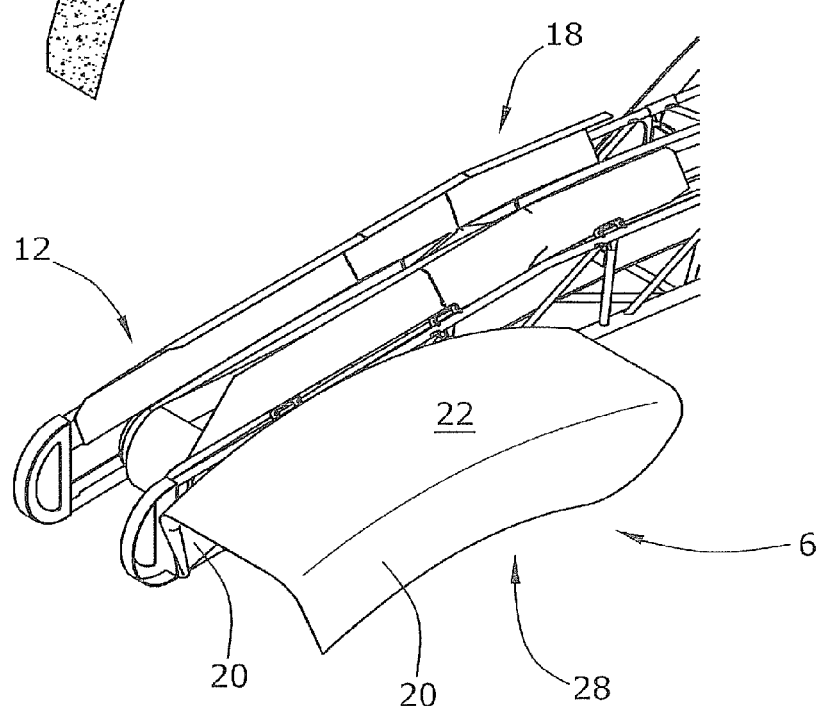
FIG. 3a shows the shielding device pivoted laterally to a transport position.
Figure 3B:
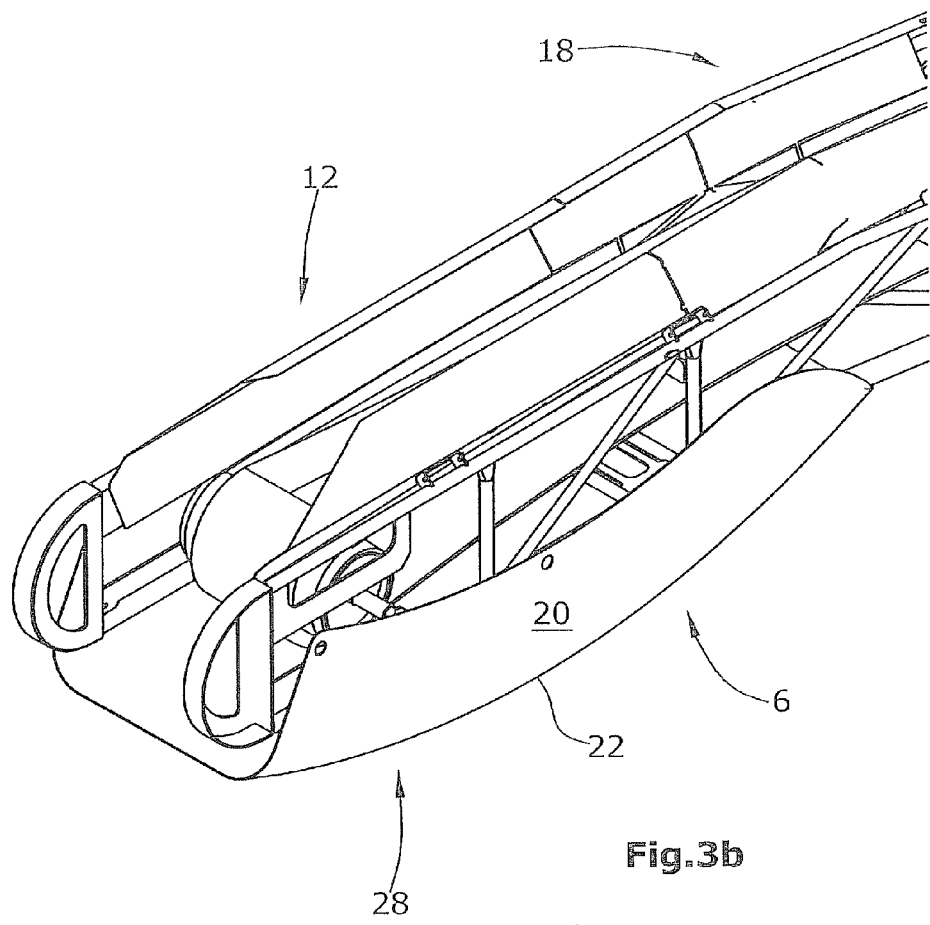
FIG. 3b shows the shielding device pivoted downward to a transport position.
Figure 3C:
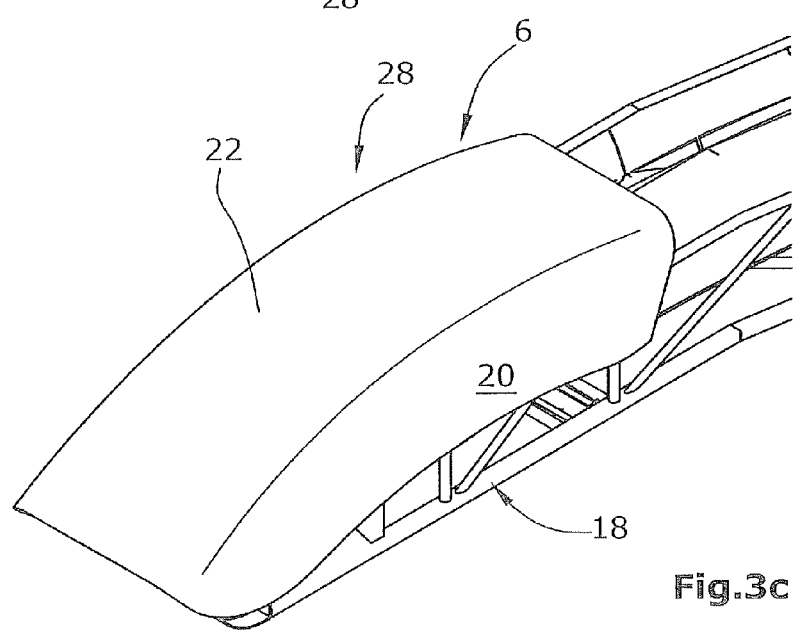
FIG. 3c shows the shielding device shifted rearward to a transport position.

FIGS. 3a to 3c show different embodiments in which the shielding device 6 has been transferred from the operating position 26 shown in FIG. 2 into a transport position 28.

FIG. 3a, for example, shows the shielding device 6 being pivoted laterally about an essentially vertical axis or about an axis which extends orthogonally to the discharge end 12 of the conveying device 18, respectively, or about an axis extending essentially orthogonally to the loading surface at the discharge end 12 of the conveying device 18. In this design, the shielding device 6 is pivoted laterally next to the discharge end 12 of the conveying device 18.

FIG. 3b shows a different embodiment in which the shielding device 6 is pivotable preferably downwards about an essentially horizontal axis in order to be transferred into a transport position 28 and locked in the same.

Figure 5A:
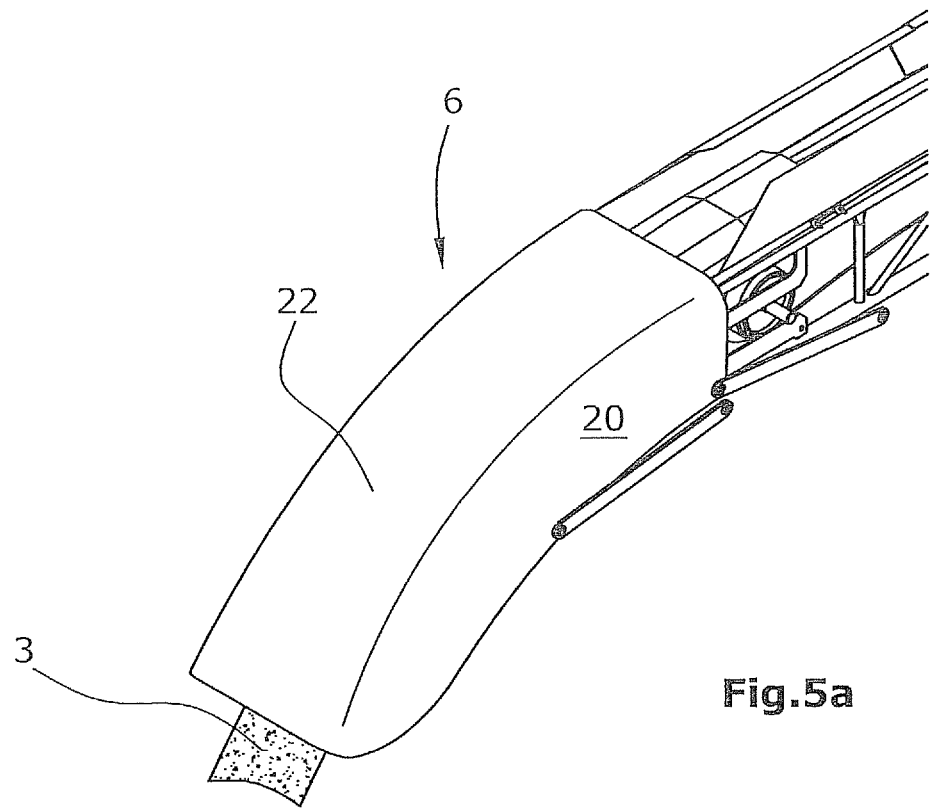
FIG. 5a shows an operating position of a shielding device which is shiftable by means of a link mechanism.
Figure 5B:
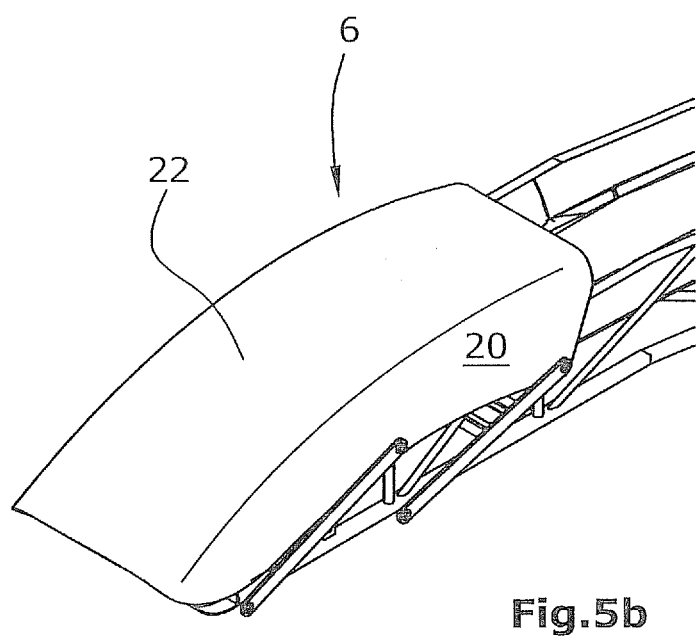
FIG. 5b shows the shielding device of FIG. 5a in a transport position.

FIG. 3c shows, in a schematic illustration, an embodiment in which the shielding device 6 is shifted against the conveying direction 24 towards the rear, for example, by means of rail guides formed accordingly or by means of a four-link mechanism as shown in FIGS. 5a, 5b and 6.

Figure 4A:
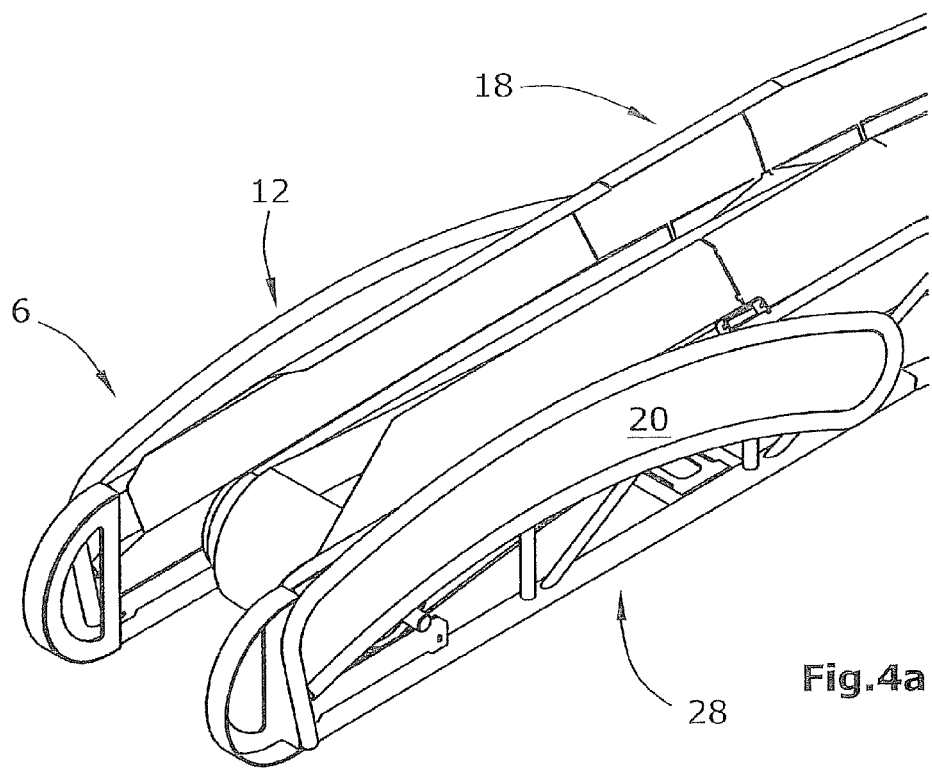
FIG. 4a shows a multi-part shielding device without cover in transport position.
Figure 4B:
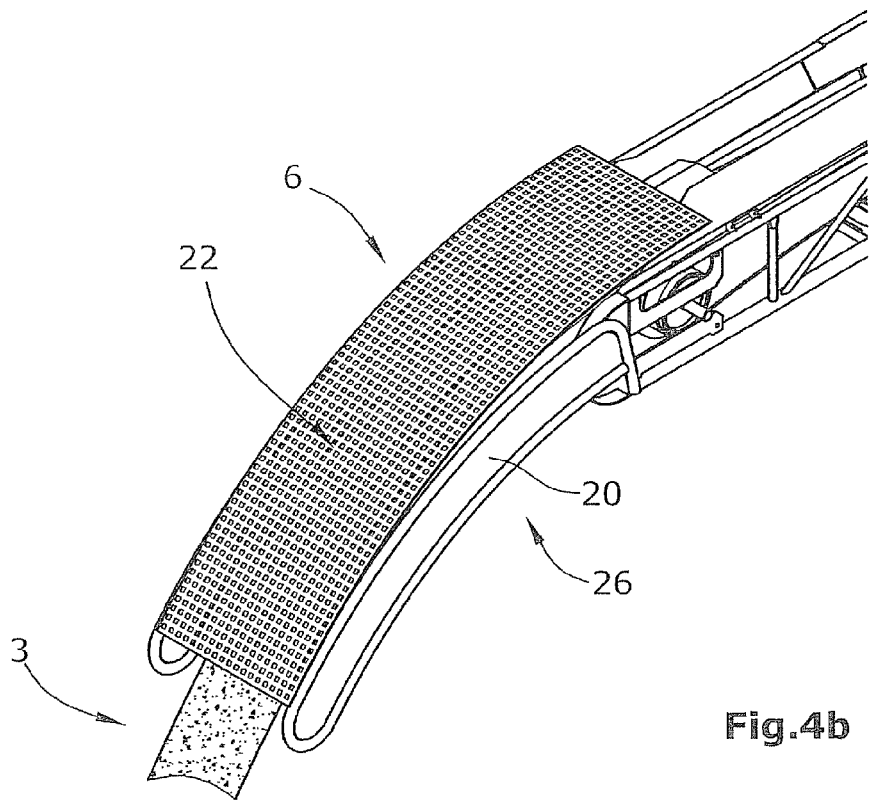
FIG. 4b shows a multi-part shielding device with cover in operating position.

FIG. 4a shows a multi-part shielding device 6 which may either comprise only two laterally pivotable lateral sections 20 or, as in shown FIG. 4b, may additionally comprise a cover 22 when in the operating position 26. In the embodiments of FIGS. 4a and 4b, the lateral sections 20 may widen in the conveying direction, as depicted in FIG. 6, in order to ensure lateral shielding also at the lowest possible conveying speed.

The cover 22 may be formed of different materials, for example, of a continuous sheet metal part or a screen plate or of a rollable fabric, in particular a rubber fabric or a tarpaulin, in which case the cover may also be transferred, in the type of a roller shutter, along guides at the lateral sections 20 from the transport position 28 into an operating position 26.

Finally, the cover 22 may be of a shiftable or rollable design while the lateral sections are pivotable.

In effect, the different embodiments of the shielding device 6 enable the shielding against outer influences, such as strong winds, so that these cannot impair the flight path along the parabolic trajectory 9. Particularly advantageous is also the cover 22 to the top which, on the one hand, does not impair the flight path of the parabolic trajectory and invariably avoids contact with the milled-off material 3 but, on the other hand, together with the lateral sections 20 is suited to prevent, to the greatest possible extent, individual particles from leaving the normally resulting parabolic trajectory 9 of the main stream of material.

FIG. 6 shows a shielding device 6 pivotable about a four-link mechanism with side panels 20 widened towards the bottom in the case of a main stream of material at the lowest possible conveying speed of the conveying device 18.

The invention claimed is:

1. A milling machine for working ground surfaces, comprising:
a machine frame;
a milling drum supported from the machine frame;
at least one conveyor arranged on the machine frame to accept milled-off material from the milling drum, the at least one conveyor including a discharge end to discharge the milled-off material in a conveying direction along a parabolic trajectory; and
a shield including lateral shield sections, the shield including an operating position in which the shield is arranged to shield the milled-off material leaving the at least one conveyor along at least part of the parabolic trajectory without influencing the parabolic trajectory;
wherein the shield includes a cover, and the cover includes a curvature radius in the conveying direction at least as large as a farthest reaching parabolic trajectory of the milled-off material at a maximum conveying speed of the at least one conveyor.

2. The milling machine of claim 1, wherein the shield is movable between the operating position and a transport position.

3. The milling machine of claim 2, wherein the shield is pivotable laterally about an axis extending essentially orthogonally to a loading surface of the at least one conveyor, or about an essentially vertical axis, from the operating position to the transport position.

4. The milling machine of claim 2, wherein the shield is shiftable in a longitudinal direction of the at least one conveyor from the transport position to the operating position, the transport position being located rearward of the operating position relative to the conveying direction of the at least one conveyor.

5. The milling machine of claim 2, wherein the shield is pivotable downward about an essentially horizontal axis from the operating position to the transport position.

6. The milling machine of claim 1, wherein the shield has a U-shaped cross-section including the lateral shield sections to shield the milled-off material from sideways influences and including the cover to shield the milled-off material from above.

7. The milling machine of claim 1, wherein the shield is of multi-part design, and the lateral shield sections are separately movable lateral panels.

8. The milling machine of claim 1, wherein the cover comprises a solid cover plate.

9. The milling machine of claim 1, wherein the cover comprises a screen plate.

10. The milling machine of claim 1, wherein the cover comprises a flexible surface structure.

11. The milling machine of claim 1, wherein the lateral shield sections include a vertical width increasing downwards in the conveying direction.

12. A method of operating a milling machine, comprising:
(a) milling off material from a ground surface with a milling drum;
(b) receiving milled-off material on a conveyor;
(c) discharging a stream of the milled-off material from the conveyor along a parabolic trajectory onto a point of discharge; and
(d) shielding the stream of material at least from the lateral sides without influencing the parabolic trajectory;
wherein step (d) further comprises shielding the stream of material from above with a cover, the cover including a curvature radius in a conveying direction at least as large as the parabolic trajectory at a maximum conveying speed of the milled-off material.

13. The method of claim 12, further comprising:
performing step (d) with a shield located in an operating position; and
after step (d), moving the shield to a transport position during standstill of the milling operation or for transport of the milling machine.

14. The method of claim 12, wherein:
step (d) is performed at a lowest possible conveying speed of the conveyor by widened portions of lateral shield sections.

15. A method of operating a milling machine, comprising:
(a) milling off material from a ground surface with a milling drum;
(b) receiving milled-off material on a conveyor;
(c) discharging a stream of the milled-off material from the conveyor along a parabolic trajectory onto a point of discharge; and
(d) shielding the stream of material at least from the lateral sides without influencing the parabolic trajectory; and
wherein step (d) is performed at a lowest possible conveying speed of the conveyor by widened portions of lateral shield sections.

16. A milling machine for working ground surfaces, comprising:
a machine frame;
a milling drum supported from the machine frame;
at least one conveyor arranged on the machine frame to accept milled-off material from the milling drum, the at least one conveyor including a discharge end to discharge the milled-off material in a conveying direction along a parabolic trajectory; and
a shield including lateral shield sections, the shield including an operating position in which the shield is arranged to shield the milled-off material leaving the at least one conveyor along at least part of the parabolic trajectory without influencing the parabolic trajectory;
wherein the shield is pivotable laterally about an axis extending essentially orthogonally to a loading surface of the at least one conveyor, or about an essentially vertical axis, from the operating position to the transport position.

17. A milling machine for working ground surfaces, comprising:
a machine frame;
a milling drum supported from the machine frame;
at least one conveyor arranged on the machine frame to accept milled-off material from the milling drum, the at least one conveyor including a discharge end to discharge the milled-off material in a conveying direction along a parabolic trajectory; and
a shield including lateral shield sections, the shield including an operating position in which the shield is arranged to shield the milled-off material leaving the at least one conveyor along at least part of the parabolic trajectory without influencing the parabolic trajectory;
wherein the shield is shiftable in a longitudinal direction of the at least one conveyor from the transport position to the operating position, the transport position being located rearward of the operating position relative to the conveying direction of the at least one conveyor.

18. A milling machine for working ground surfaces, comprising:
- a machine frame;
- a milling drum supported from the machine frame;
- at least one conveyor arranged on the machine frame to accept milled-off material from the milling drum, the at least one conveyor including a discharge end to discharge the milled-off material in a conveying direction along a parabolic trajectory; and
- a shield including lateral shield sections, the shield including an operating position in which the shield is arranged to shield the milled-off material leaving the at least one conveyor along at least part of the parabolic trajectory without influencing the parabolic trajectory;
- wherein the shield is of multi-part design, and the lateral shield sections are separately movable lateral panels.

19. The milling machine of claim 18, wherein the shield further includes a cover.

20. A milling machine for working ground surfaces, comprising:
- a machine frame;
- a milling drum supported from the machine frame;
- at least one conveyor arranged on the machine frame to accept milled-off material from the milling drum, the at least one conveyor including a discharge end to discharge the milled-off material in a conveying direction along a parabolic trajectory; and
- a shield including lateral shield sections, the shield including an operating position in which the shield is arranged to shield the milled-off material leaving the at least one conveyor along at least part of the parabolic trajectory without influencing the parabolic trajectory;
- wherein the shield includes a cover comprising a screen plate.

21. A milling machine for working ground surfaces, comprising:
- a machine frame;
- a milling drum supported from the machine frame;
- at least one conveyor arranged on the machine frame to accept milled-off material from the milling drum, the at least one conveyor including a discharge end to discharge the milled-off material in a conveying direction along a parabolic trajectory; and
- a shield including lateral shield sections, the shield including an operating position in which the shield is arranged to shield the milled-off material leaving the at least one conveyor along at least part of the parabolic trajectory without influencing the parabolic trajectory, wherein the lateral shield sections include a vertical width increasing downwards in the conveying direction.

* * * * *